US009297677B2

(12) United States Patent
Suzuki et al.

(10) Patent No.: US 9,297,677 B2
(45) Date of Patent: Mar. 29, 2016

(54) GAS FLOW RATE MEASURING APPARATUS FOR MINIMIZING TEMPERATURE DEPENDENT ERRORS

(75) Inventors: Kazunori Suzuki, Hitachinaka (JP); Keiichi Nakada, Hitachinaka (JP); Ryo Sato, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/240,917

(22) PCT Filed: Aug. 16, 2012

(86) PCT No.: PCT/JP2012/070807
§ 371 (c)(1),
(2), (4) Date: Feb. 25, 2014

(87) PCT Pub. No.: WO2013/046981
PCT Pub. Date: Apr. 4, 2013

(65) Prior Publication Data
US 2014/0190270 A1    Jul. 10, 2014

(30) Foreign Application Priority Data

Sep. 30, 2011   (JP) .................. 2011-215905

(51) Int. Cl.
*G01F 1/68* (2006.01)
*G01F 1/64* (2006.01)
*G01F 1/696* (2006.01)
*G01F 1/684* (2006.01)
*G01F 5/00* (2006.01)

(52) U.S. Cl.
CPC ............... *G01F 1/64* (2013.01); *G01F 1/6842* (2013.01); *G01F 1/696* (2013.01); *G01F 1/6965* (2013.01); *G01F 5/00* (2013.01)

(58) Field of Classification Search
None
See application file for complete search history.

(56) References Cited

U.S. PATENT DOCUMENTS 5,780,735 A *   7/1998   Kadohiro et al. ............ 73/202.5
6,209,402 B1    4/2001   Yamada
(Continued)

FOREIGN PATENT DOCUMENTS

JP        09-265321      10/1997
JP        10-197309       7/1998
(Continued)

OTHER PUBLICATIONS

PCT International Search Report and Written Opinion on application PCT/JP2012/070807 mailed Oct. 30, 2012; 2 pages.

*Primary Examiner* — Harshad R Patel
(74) *Attorney, Agent, or Firm* — Foley & Lardner LLP

(57) ABSTRACT

A gas flow rate measuring apparatus including a gas flow rate detection circuit configured to output a first analog signal of a gas flow rate of a gas; a gas temperature detection element configured to output a second analog signal of a temperature of the gas or a temperature of an integrated circuit; analog-to-digital converters for converting the analog signals into respective digital signals; a digital signal correction device comprising a map table and configured to correct a characteristic bend of the first digital signal based on the map table and the second digital signal, wherein the map table comprises correction constants arranged as lattice points, wherein a first number of lattice points in a first region of the characteristic bend of the gas flow rate signal is larger than a second number of lattice points of a second region outside the first region of the characteristic bend.

7 Claims, 11 Drawing Sheets

(56) References Cited

U.S. PATENT DOCUMENTS

| | | |
|---|---|---|
| 6,397,673 B1 | 6/2002 | Kanke et al. |
| 6,494,090 B1 | 12/2002 | Losing et al. |
| 6,708,560 B2 * | 3/2004 | Watanabe et al. ........... 73/204.22 |
| 7,530,267 B2 * | 5/2009 | Uramachi .................... 73/202.5 |
| 2006/0137445 A1 * | 6/2006 | Smith et al. ................ 73/204.22 |
| 2007/0089503 A1 * | 4/2007 | Nakano et al. ............. 73/204.26 |
| 2007/0125169 A1 * | 6/2007 | Nakano et al. ............. 73/204.26 |
| 2009/0299657 A1 * | 12/2009 | Mizutani et al. ................ 702/45 |
| 2012/0192632 A1 * | 8/2012 | Matsumoto et al. ....... 73/114.31 |
| 2013/0152699 A1 * | 6/2013 | Suzuki et al. .............. 73/861.02 |

FOREIGN PATENT DOCUMENTS

| | | |
|---|---|---|
| JP | 11-316145 | 11/1999 |
| JP | 2000-002575 A | 1/2000 |
| JP | 2007-071889 A | 3/2007 |
| WO | WO 02/21084 A1 | 3/2002 |

\* cited by examiner

FIG.15

| No | FIRST COORDINATE CONVERSION | SECOND COORDINATE CONVERSION |
|---|---|---|
| 1 | MAP | MAP |
| 2 | MAP | N-th ORDER FUNCTION |
| 3 | N-th ORDER FUNCTION | MAP |
| 4 | N-th ORDER FUNCTION | N-th ORDER FUNCTION |

# GAS FLOW RATE MEASURING APPARATUS FOR MINIMIZING TEMPERATURE DEPENDENT ERRORS

TECHNICAL FIELD

The present invention relates to a gas flow rate measuring apparatus, and particularly to intake air flow rate measurement of an engine.

BACKGROUND ART

In an automotive engine, it is necessary to measure the intake air flow rate in order to control the fuel injection amount. A kind of apparatus for measuring the intake air flow rate is a gas flow rate measuring apparatus of the heat generating resistor type. It is desirable for the gas flow rate measuring apparatus of the heat generating resistor type to exhibit a little variation in output signal, namely, a minor temperature-dependent error, even in the eventuality of a temperature change.

In order to minimize the temperature-dependent error is necessary to correct the temperature-dependent error of a gas flow rate detection signal from a gas temperature or board temperature detection signal.

There is a technology disclosed in JP-2007-071889-A that locally improves the resolution using an irregular-interval correction table in order to enhance the minimum requisite resolution. A gas flow rate measuring apparatus of the heat generating resistor type generally includes an arithmetic operation circuit having table data relating to characteristics of air flow rate and air output. The arithmetic operation circuit divides an area of the table data and uses a correction expression of the output characteristics converted for each of the divisional air flow rate regions to calculate an air flow rate. The area division of the table data is configured from a low flow rate region of the air flow rate divided more finely than a high flow rate region. This division makes it possible to improve the low flow rate accuracy without an extreme increase in the number of data of the table.

PRIOR ART LITERATURE

Patent Document

Patent Document 1 JP-2007-071889-A

SUMMARY OF THE INVENTION

Problem to be Solved by the Invention

Digital correction generally requires an improvement in the resolution of the table to reduce the correction error and achieve a high degree of accuracy over an overall flow rate range. However, the rise in the number of data of the table increases the search number and slows down the arithmetic operation process.

Patent Document 1 does not use interpolation by a function but a table to correct the non-linearity of the gas flow rate signal and the gas temperature dependency. The correction accuracy, however, depends upon the number of data when correction is carried out using a table. Hence, the correction error becomes larger as the number of data decreases although correction of a higher degree of accuracy can be achieved as the number of data rises.

The number of data of the table may be increased to improve the accuracy, which leads to a higher cost because of an expansion in the scale of the arithmetic operation circuit. Further, the resolution may be locally heightened by irregular intervals between each data of the table as a method for enhancing the accuracy without escalation of the data number of the table. The use of the irregular-interval table on the other hand raises the arithmetic operation load, which may result in the slower arithmetic operation process.

In addition, the data intervals of the table need to be determined in advance in order to locally improve the resolution at a flow rate other than a low flow rate.

The object of the present invention is to improve correction accuracy of a flow rate signal.

Means for Solving the Problem

In order to achieve the above object of the present invention, there is provided a gas flow rate measuring apparatus that has a gas flow rate detection circuit, and a gas temperature detection element or a substrate temperature detection element. The gas flow rate detection circuit is configured to detect a current flowing through at least one resistive element disposed in a gas flow path, or a voltage generated in response to the current to output a gas flow rate detection signal in accordance with a flow rate of gas flowing in the gas flow path. The gas temperature detection element detects a temperature of the gas in the gas flow path, and the substrate temperature detection element detects a temperature of a substrate provided in the inside of an integrated circuit. The gas flow rate measuring apparatus corrects characteristics of the gas flow rate detection signal on the basis of a temperature detection signal obtained from the gas temperature detection element or the substrate temperature detection element. The gas flow rate measuring apparatus further includes signal conversion means for correcting a characteristic bend displaced by more than a certain fixed amount from target characteristics of the gas flow rate detection signal.

Effect of the Invention

The present invention makes it possible to improve the correction accuracy of the flow rate signal.

BRIEF DESCRIPTION OF THE DRAWINGS

FIG. 15 is a view illustrating combinations in coordinate conversion in the third embodiment.

MODE FOR CARRYING OUT THE INVENTION

Embodiments of an air flow rate measuring apparatus according to the present invention are explained with reference to the drawings. The air flow rate measuring apparatus is described below.

First, the first embodiment of the present invention is described with reference to FIGS. 1 to 6.

Figure 1:
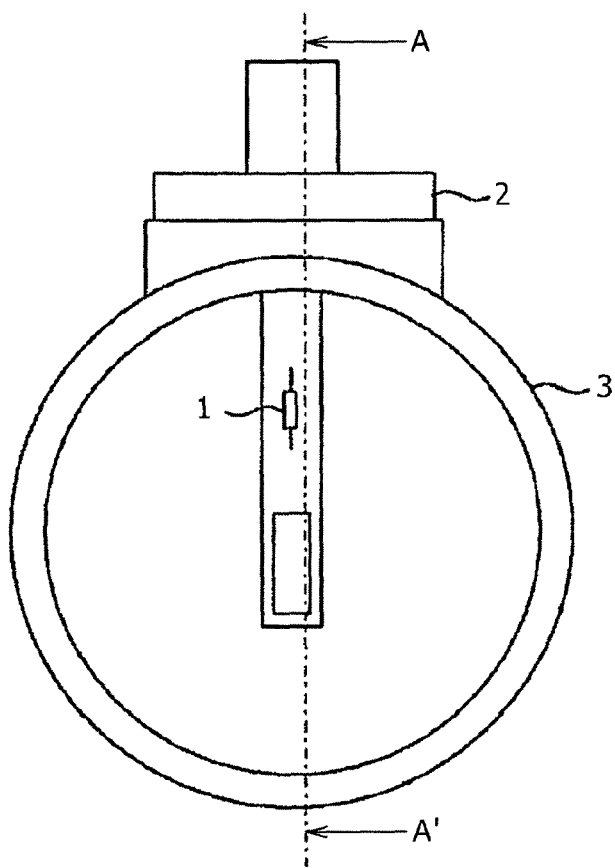
FIG. 1 is a view depicting an air flow rate measuring apparatus mounted on a body.

Referring to FIG. 1, an air flow rate measuring apparatus 2 which an intake air temperature detection element 1 is provided with is inserted in a gas flow path body 3.

Figure 2:
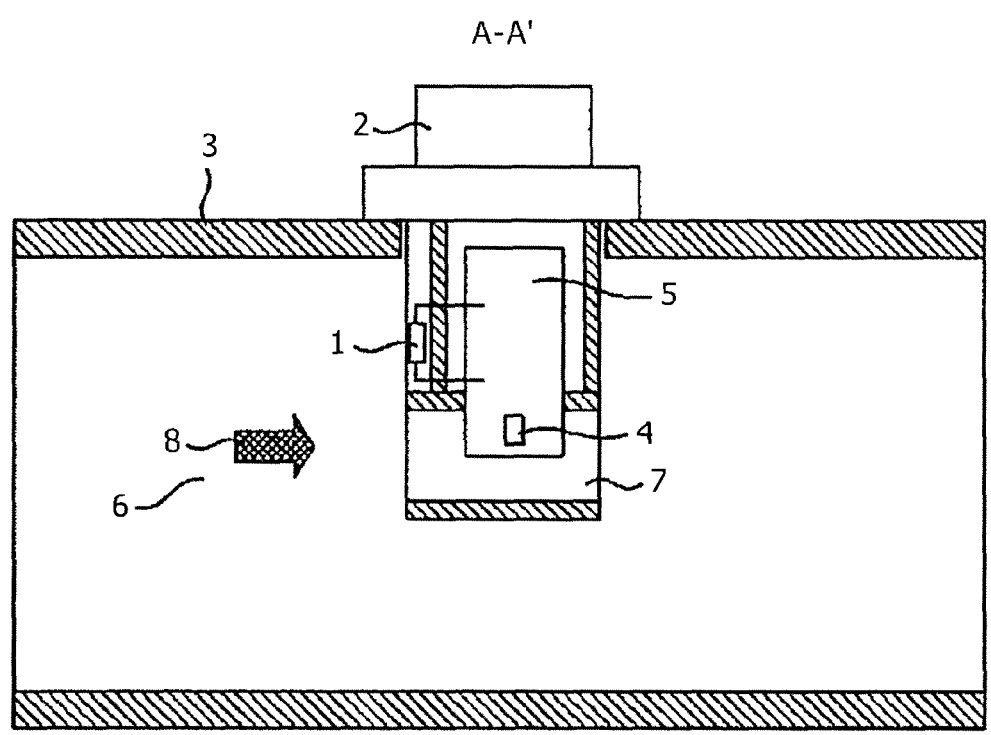
FIG. 2 is a sectional view taken along line A-A' of FIG. 1.

Referring to FIG. 2, the air flow rate measuring apparatus 2 is configured to be attached to the gas flow path body 3 that forms an intake air flow path of an internal combustion engine so as to be exposed to gas 8 flowing through a main bypass-passage 6. To this end, the gas temperature detection element (also called as thermistor or gas temperature measuring resistive element) 1 is provided on the upstream of the air flow rate measuring apparatus 2 in such a manner as to be exposed directly to fluidic intake air. A gas flow rate detection element 4 is mounted on a substrate 5, and only a region in which the gas flow rate detection element 4 is attached is provided in a sub-bypass-passage 7. The substrate also 5 includes a gas temperature detection circuit 22 which is isolated from the sub-bypass-passage 7.

Figure 3:
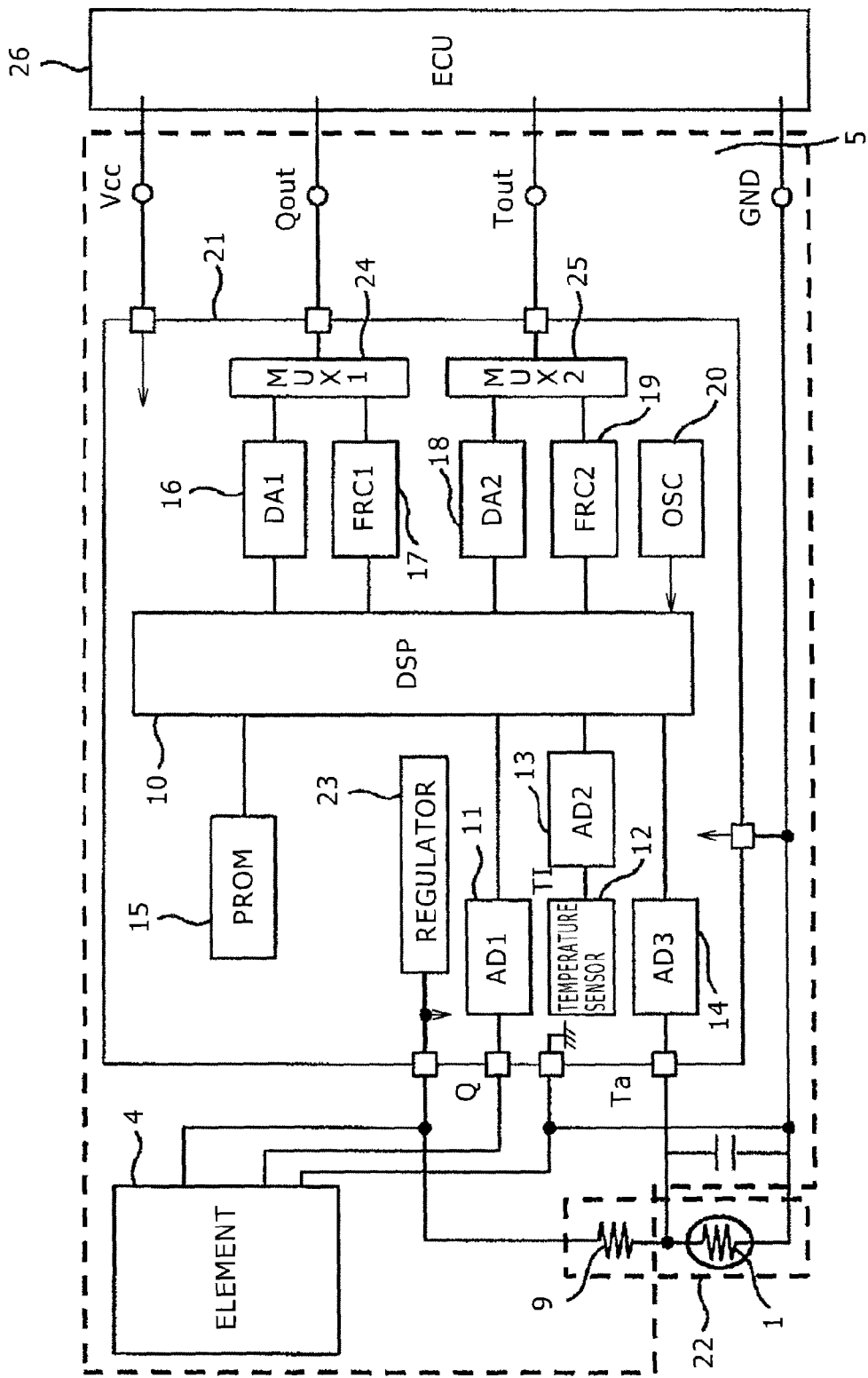
FIG. 3 is a circuit diagram of an air flow rate measuring apparatus according to a first embodiment.

Referring to FIG. 3, a gas temperature detected by the gas temperature detection element 1 is converted into a voltage signal by the gas temperature detection circuit 22 on the substrate 5 and is input to an analog-digital converter AD3 14. In an integrated circuit 21, a temperature sensor 12 in the integrated circuit is provided in order to identify a substrate temperature to be used for detection of a temperature equivalent to that of the substrate 5. Consequently, the gas temperature and the temperature of the air flow rate measuring apparatus 2 can be detected individually.

The gas temperature detection circuit 22 is configured by series connection of the gas temperature detection element 1 disposed in the intake air flow path to a fixed resistor 9. A constant voltage of an output of a regulator 23 is supplied to the gas temperature detection circuit 22.

At the time of the correction, three digital values obtained by conversion of; a gas flow rate detection signal Ta from the gas flow rate detection element 4 by an analog-digital converter AD1 11; a substrate temperature signal from the temperature sensor 12 in the integrated circuit by another analog-digital converter AD2 13; and a gas temperature signal Q from the gas temperature detection element 1 by the analog-digital converter AD3 14 are used. The correction is carried out with reference to a table based on digital signals of the digital values in addition to the respective digital values. The table is a list in which correction constants for a standardized gas flow rate signal and a standardized gas temperature signal are arranged in a lattice pattern. A method of calculating a correction value in accordance with the flow rate signal and the temperature signal using the table is hereinafter referred to as table correction. A point of intersection of the standardized flow rate signal and temperature signal is referred to as lattice point and provides a correction constant. A correction constant used in table correction is subjected to a correction arithmetic operation process on the basis of a constant stored in a PROM 15 in advance by the digital signal processing DSP 10. Digital values of the gas flow rate signal and the gas temperature signal corrected in this manner are subjected to an analog conversion using a digital-analog converter DA1 16 and another digital-analog converter DA2 18, and then are output as voltage signals. A digital value of the gas flow rate signal, on the contrary, is subjected to an analog conversion using a free-running counter FRC1 17, and then is output as a frequency signal. Similarly, a digital value of the gas temperature signal is subjected to analog conversion using a free-running counter FRC2 19 and is output as a frequency signal. Selection of the digital-analog converter DA1 16 and the free-running counter FRC1 17 can be performed by setting of a multiplexer MUX1 24. The digital-analog converter DA2 18 and the free-running counter FRC2 19 can be selected by the setting of another multiplexer MUX2 25. The entire circuit is driven by an oscillator 20. The air flow rate measuring apparatus is electrically connected to an ECU 26.

Figure 4:
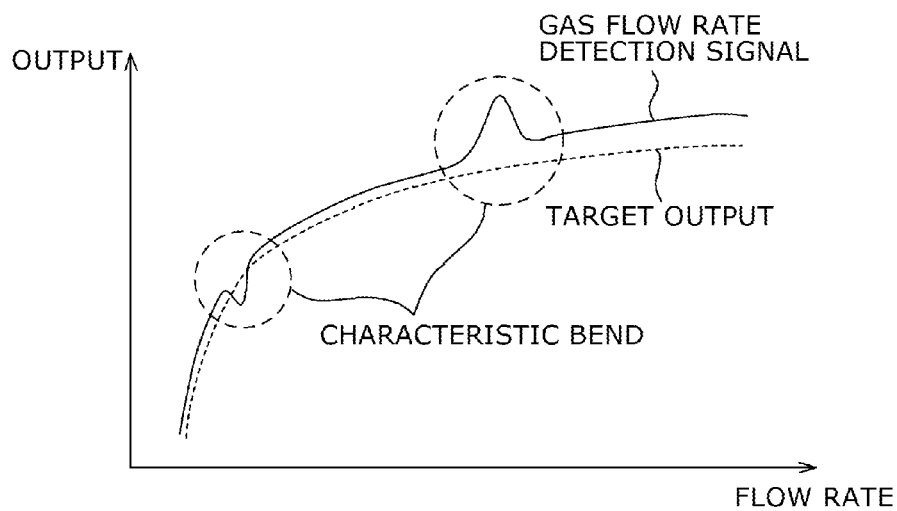
FIG. 4 is a diagram illustrating characteristics of an air flow rate detection signal.

FIG. 4 illustrates a gas flow rate detection signal and a target output. Fluid, a laminar flow or a turbulent flow, includes a point at which the laminar flow transits to the turbulent flow, which affects the gas flow rate detection signal to have a characteristic bend. The magnitude of the characteristic bend or the spot of the characteristic bend differs depending upon the structure of the air flow rate measuring apparatus, and particularly the structure at the proximity of the gas flow rate detection element 4. The characteristic bend here signifies a bend which is displaced by more than a fixed amount from the target characteristics illustrated in FIG. 4.

Figure 5:
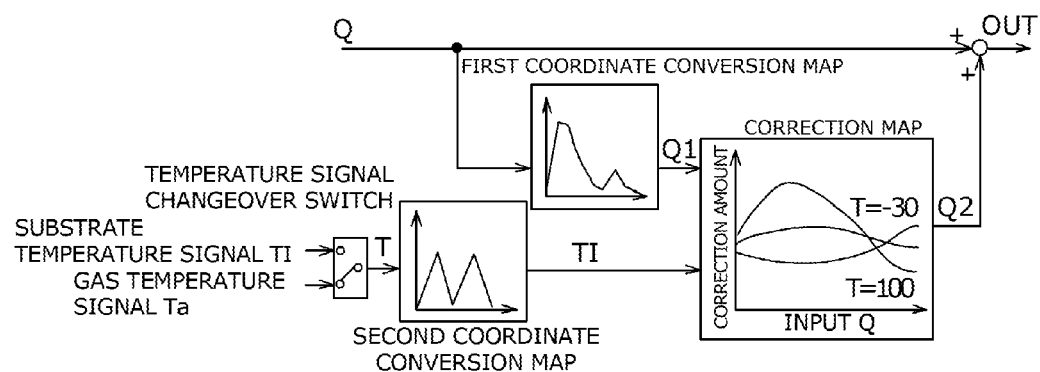
FIG. 5 is a view illustrating conversion of a detection signal in the first embodiment.
Figure 6:
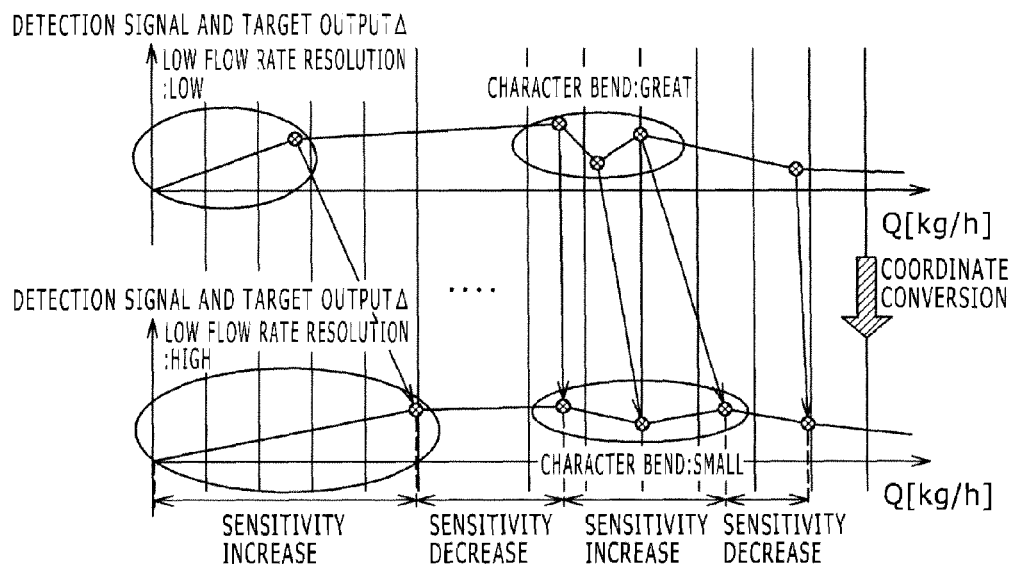
FIG. 6 is a diagram illustrating coordinate conversion of a flow rate signal.

FIG. 5 illustrates a method for correcting a characteristic bend. At the time of correction using signals obtained by converting the gas flow rate signal, substrate temperature signal, and gas temperature signal into digital values, provided is a switch to select the substrate temperature signal T1 or the gas temperature signal Ta to be used for the temperature signal. This switch can be changed over by a constant in the PROM 15. The gas flow rate detection signal Q is converted into Q1 with reference to the first coordinate conversion table, and the gas temperature signal Ta is converted into T1 with reference to the second coordinate conversion table. The first coordinate conversion table is for characteristics conversion of the gas flow rate detection signal Q and has 17 lattice points. The second coordinate table contrarily is for characteristics conversion of the gas temperature signal T1 and has five lattice points. Since the characteristics of the gas flow rate signal and the gas temperature signal are different from each other, different coordinate conversion tables are used for the signals. The correction using signals Q1 and T1 leads to the better improvement in the resolution at the proximity of the characteristic bend in the correction table, in comparison with Q and T from Q1 and T1 which have been subjected to a characteristics conversion by the coordinate conversion of the original characteristics. An output Q2 corrected with reference to the correction table is added to and output together with the original gas flow rate detection signal Q. By correction of the gas flow rate signal and the gas temperature-dependent error with reference to the correction table using Q1 and T1 as the input signals, it is possible to improve the resolution at the proximity of the characteristic bend of the temperature and the flow rate, and correct them with a high accuracy. FIG. 6 illustrates such characteristics before and after the coordinate conversion. The characteristics conversion directed to portions of the great characteristic bend by using coordinate conversion increases the number of lattice points allocatable to the spots of the characteristic bend, and thus improves the resolution.

Figure 7:
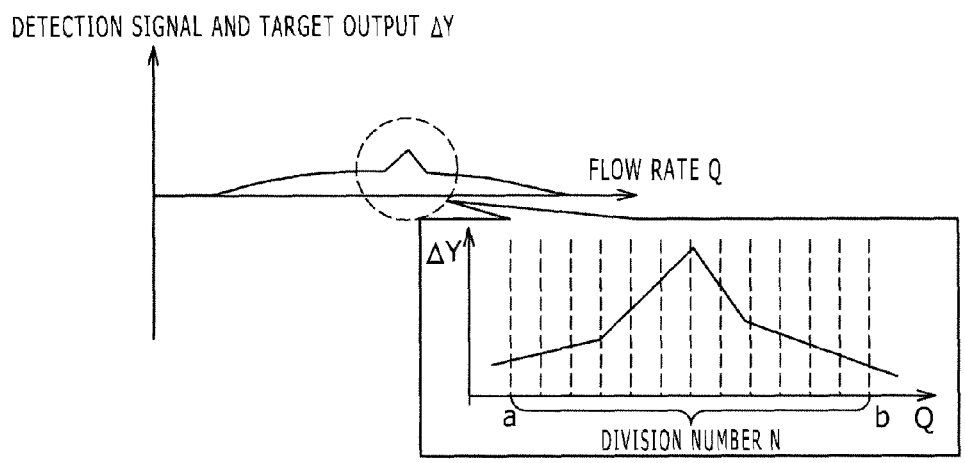
FIG. 7 is a view illustrating a characteristic bend of the air flow rate detection signal in the first embodiment.

In order to correct a local characteristic bend spot with a high accuracy, it is necessary to enhance the resolution at the characteristic bend spot with reference to the first and second coordinate conversion tables. To this end, a method of determining the resolution at the proximity of the characteristic bend on the basis of the magnitude of the bend after deciding the magnitude of a local characteristic bend is described with reference to FIG. 7. FIG. 7 is a graph illustrating, on the axis of ordinate, the difference ΔY between the target output and the gas flow rate detection signal detected by the gas flow rate detection element 4 with respect to the gas flow rate detection signal Q represented on the axis of abscissa. It is to be noted, however, that this graph indicates the difference when the gas flow rate detection signal is zero-span-adjusted at two points of a high flow rate and a low flow rate with respect to the target output. The value of the following expression (1) is used here for the calculation of the characteristic bend.

$$S = \sum_{q=a}^{b} \left| \frac{d(\Delta Y)}{d(Q)} \right|_q \Big/ n \quad \text{[Expression 1]}$$

Figure 8:
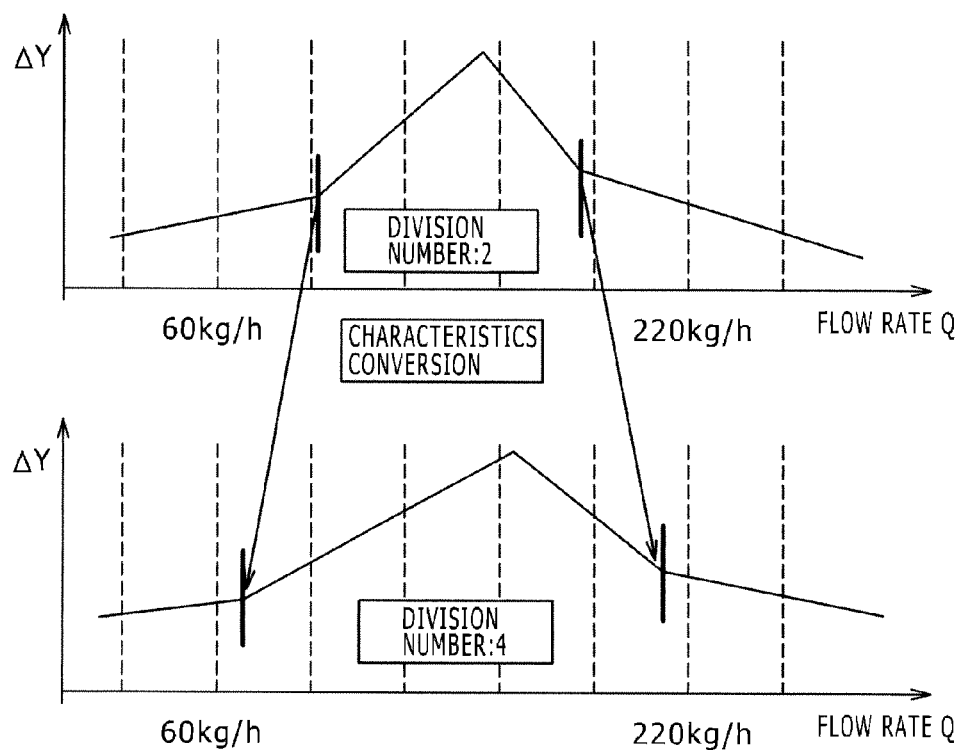
FIG. 8 is a diagram illustrating characteristics conversion of the flow rate signal.

S is a value indicative of a magnitude of the characteristic bend which is calculated from the magnitude of this value. It is determined at which point the characteristic bend is present within the range of a-b. The specification of the place and scale enables the division number at the proximity of the characteristic bend spot to be determined with reference to the first and second coordinate conversion tables. As illustrated in FIG. 8, when a and b, with which S is equal to or higher than 0.055, are 60 kg/h and 220 kg/h, respectively, the characteristics conversion is carried out with reference to the coordinate conversion tables such that the lattice resolution between 60 kg/h and 220 kg/h is doubled. S being 0.055 corresponds to approximately 2% in flow rate error; a and b are determined so as to cover the characteristic bend. This is because, when only one half of the characteristic bend has been included between a and b, S cannot be calculated correctly. Therefore, the distance between a and b depends upon the magnitude of the characteristic bend. Where the characteristic bend is great in magnitude, the distance between a and b is long, but where the characteristic bend is small, the distance between a and b is short also.

In this manner, in the present embodiment, where the air flow rate is represented by Q; the value obtained by zero spanning of output characteristics of the air flow rate detection signal which is a target after correction and an output of a gas flow rate signal of the resistive element is represented by ΔY; the minimum value of a search region (range) for the characteristic bend is represented by a; the maximum value of the search region for the characteristic bend is represented by b; a division number between a and b is represented by n; and the product of a value obtained by dividing the sum of ΔY and a gradient of Q and a value represented by $\Delta Y_{max}$ when ΔY is highest between a and b or a value represented by $\Delta Y_{min}$ when ΔY is lowest between a and b for individual intervals obtained by the division between a and b is represented by S, a location of a characteristic bend is searched for on the basis of a and b and the magnitude of the characteristic bend is determined by the magnitude of S. Then, when the value of an absolute value |S| of S is equal to or higher than 0.005, the gas flow rate detection signal is corrected such that the value of |S| is equal to or lower than 0.055 in accordance with the values of a, b, and S.

Figure 9:
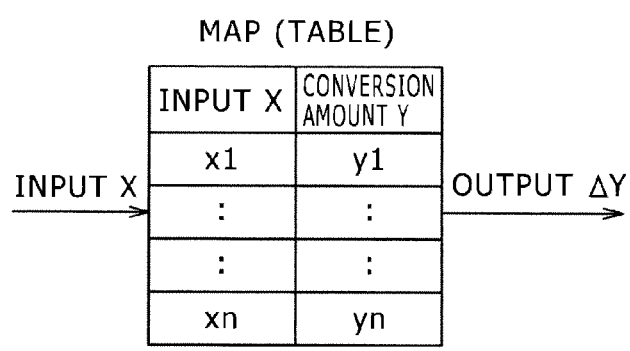
FIG. 9 is a flow diagram illustrating correction using a table.

Further, where a table is used in the first and second coordinate conversions, a table illustrated in FIG. 9 is used. A conversion amount Y is determined from S representative of a magnitude of a characteristic bend, and the table representative of a relation between the input value X and the conversion amount Y is configured from a plurality of pieces of data (n-number of inputs from x1 to xn, and n-number of conversion amounts from y1 to yn). The output ΔY after the conversion is calculated by addition of the conversion amount Y calculated with reference to the table to the input value X. If n, the number of data, of the table is large, then the correction accuracy rises, leading to the higher cost due to the hike in the data amount to be written into the PROM 15. On the contrary, the small n hinders the cost rise because of the little data amount to be written into the PROM 15, which results in the lower correction accuracy. Therefore, it is necessary to set the n used for the table to an optimum number of data in accordance with the magnitude or the number of characteristic bend of the gas flow rate detection signal. The technique in which the table is used allows for the smaller arithmetic operation process amount, compared to the correction method adopting a function.

As described above, in the present embodiment, the characteristics conversion of a flow rate signal enables a local bend to be corrected with a high accuracy without increasing the number of data of the table and having irregular intervals (with having regular intervals in other words) between each data. The present embodiment therefore can improve the accuracy in flow rate measurement.

Figure 10:
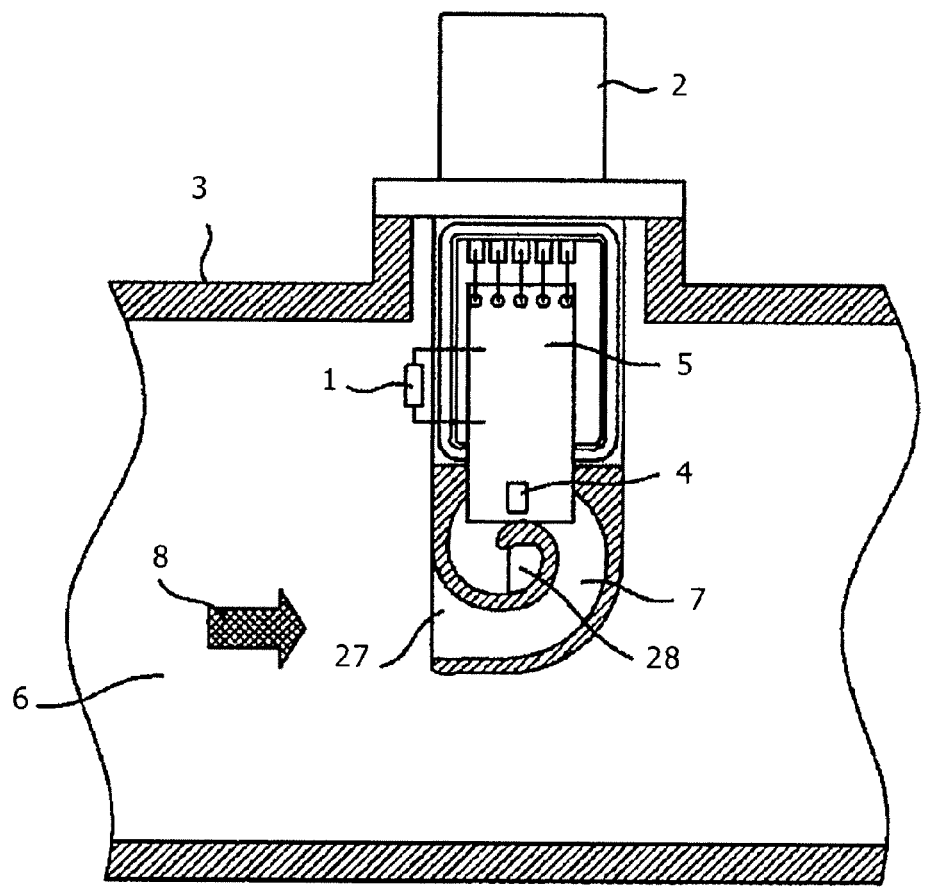
FIG. 10 is a view depicting an air flow rate measuring apparatus having a shape of a bypassing sub-bypass-passage and mounted on a body.
Figure 11:
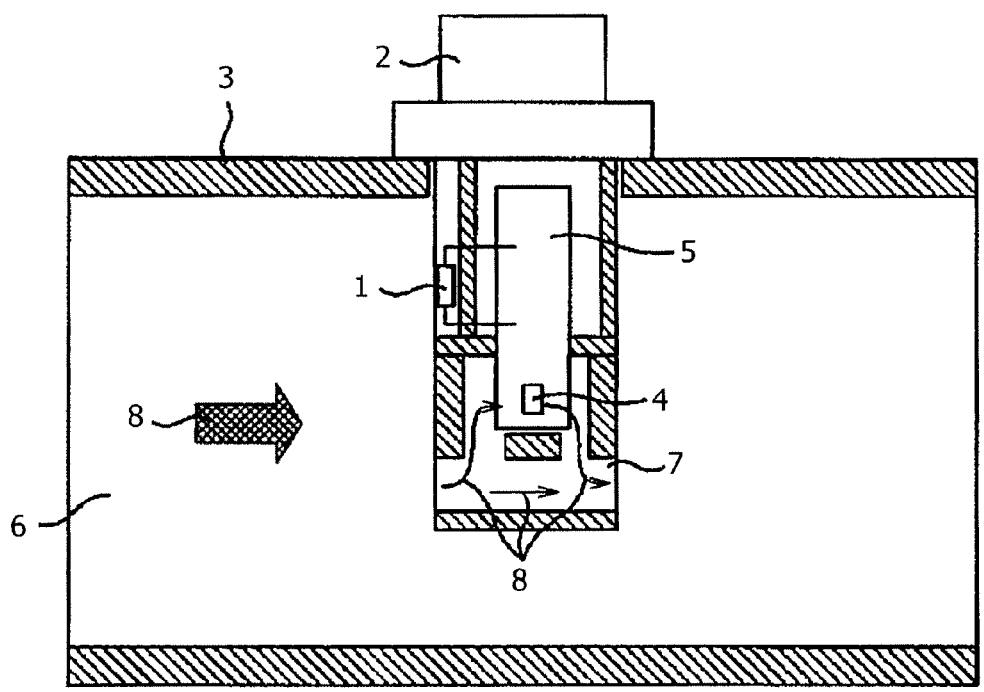
FIG. 11 is a view depicting an air flow rate measuring apparatus having a shape of a channel-shaped sub-bypass-passage and mounted on a body.
Figure 12:
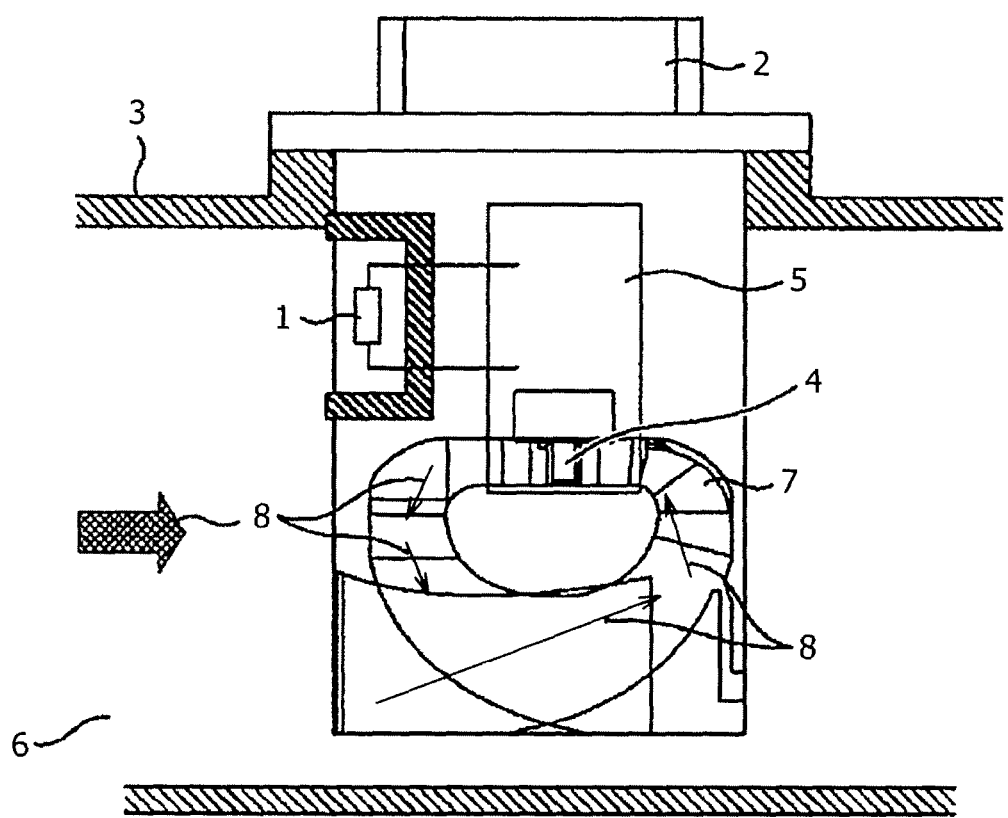
FIG. 12 is a view depicting an air flow rate measuring apparatus having a shape of an α-shaped sub-bypass-passage and mounted on a body.

Further, the present embodiment can be applied not only to such a shape as of the air flow rate measuring apparatus parallel to the main bypass-passage 6 as that of the sub-bypass-passage 7 shown in FIG. 2 but also to another structure: a spiral shape like a sub-bypass-passage 7 shown in FIG. 10, where gas entering from a sub-bypass-passage entrance 27 passes through the gas flow rate detection element 4 along the sub-bypass-passage 7 and goes out from a sub-bypass-passage exit 28. Furthermore, the present embodiment can be practiced not only for a sub-bypass-passage of a spiral shape but also for such a sub-bypass-passage as of U-shaped shown in FIG. 11 or α-shaped shown in FIG. 12.

It is to be noted that, while it has been described that the embodiment of the air flow rate measuring apparatus measures the air, the present invention can be also applied to a case in which the flow rate of gas other than the air is detected.

Figure 13:
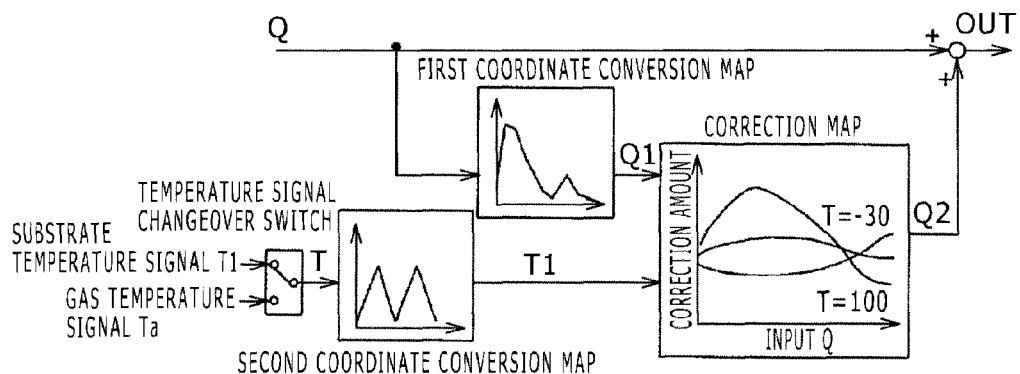
FIG. 13 is a diagram illustrating conversion of a detection signal in a second embodiment.

A second embodiment is now described with reference to FIG. 13. In the second embodiment, a signal of a substrate temperature is used as shown in FIG. 13 in place of a signal of a gas temperature in the first embodiment. The gas temperature signal Ta is used to correct a temperature-dependent error. However, in order to detect the gas temperature, the gas temperature detection element 1 is provided on the upstream of the air flow rate measuring apparatus 2 in such a manner as to be exposed directly to the intake fluid. If the gas temperature detection element 1 is disconnected, then the gas temperature will be undetectable, and thus, it will be impossible to carry out gas temperature-dependent error correction. Therefore, in the integrated circuit 21, a temperature sensor 12 in the integrated circuit is provided in order to detect the substrate temperature to be used for the detection of a temperature equivalent to that of the substrate 5, and temperature-dependent error correction is performed on the basis of the temperature signal T1 of the temperature sensor 12. Whether the temperature signal Ta from the gas temperature detection element 1 or the temperature signal T1 from the temperature sensor in the integrated circuit for detecting the substrate temperature is to be employed as the temperature signal used for the temperature-dependent error correction can be changed over depending upon information set in advance in the PROM 15. By use of the temperature signal T1 from the temperature sensor in the integrated circuit in this manner, the terminal for supporting the gas temperature detection element is eliminated, and the disconnection will not occur therefore. The temperature sensor in the integrated circuit, which is not exposed directly to the intake fluid, is not contaminated unlike the gas temperature detection element. Since the temperature sensor is not affected by a variation of the resistance value by contamination, a durable variation of the temperature characteristics can be lowered, and the accuracy thereby becomes higher.

Figure 14:
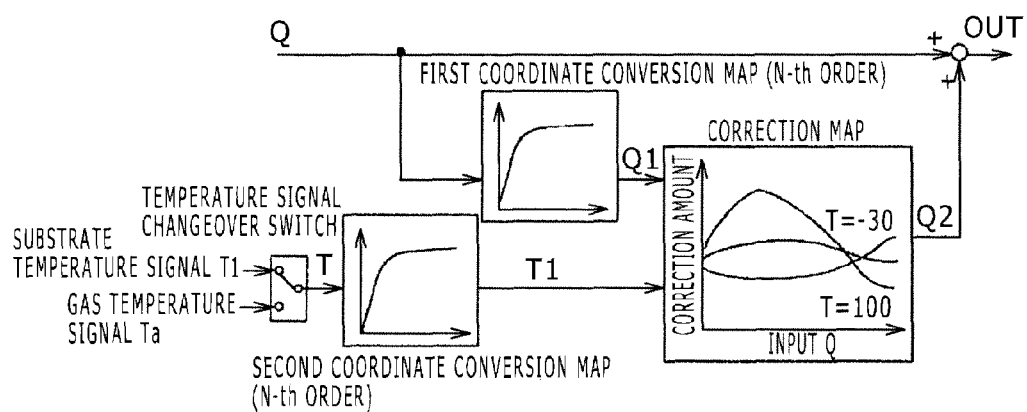
FIG. 14 is a diagram illustrating conversion of a detection signal in a third embodiment.

A third embodiment is now described with reference to FIG. 14. Different from the first and second embodiments, not a table but an Nth-order function is used for coordinate conversion. The gas flow rate detection signal Q is converted into Q1 by the first coordinate conversion. This coordinate conversion uses an N-th order function to perform conversion. Further, the coordinate conversion translates the gas temperature signal T into T1 by the second coordinate conversion. Also this coordinate conversion uses an N-th order function to carry out conversion. As shown in FIG. 15, the first coordinate conversion and the second coordinate conversion allow for several combinations of conversion based on a table and an N-th order function. Conversion by the first coordinate conversion and the second coordinate conversion both with reference to a table, conversion by the first coordinate conversion with reference to a table and the second coordinate conversion based on an N-th order function, conversion by the first coordinate conversion based on an N-th order function and the second coordinate conversion with reference to a table, or conversion by the first coordinate conversion and the second coordinate conversion both based on an N-th order function can be used for correction. Although not only correction with reference to a correction table but also correction based on an N-th order function can be carried out, where the correction table is used, it is difficult for the function to cope with a characteristic bend of the gas flow rate signal and the resolution of the characteristic bend spot is deteriorated by the table. In contrast, the first and second coordinate conversions are conversions for moderating the non-linearity of the gas flow rate signal and the gas temperature signal, respectively, and are conversions for improving the resolution of the characteristic bend spot with reference to a correction table. Therefore, even an N-th order function can be applied to the first and second coordinate conversions. Where the first coordinate conversion is performed with reference to a table and the second coordinate conversion is carried out on the basis of an N-th order function, it is possible to improve the accuracy equivalently to the working example 1. The first and second coordinate conversion tables may be regular-interval tables of an arbitrary division number.

DESCRIPTION OF REFERENCE NUMERALS 1 gas temperature detection element
2 air flow rate measuring apparatus
3 body
4 gas flow rate detection element
5 substrate
6 main bypass-passage
7 sub-bypass-passage
8 flow of air
9 fixed resistor
10 digital signal processing DSP
11 analog-digital converter AD1
12 temperature sensor in integrated circuit
13 analog-digital converter AD2
14 analog-digital converter AD3
15 PROM
16 digital-analog converter DA1
17 free-running counter FRC1
18 digital-analog converter DA2
19 free-running counter FRC2
20 oscillator
21 integrated circuit
22 gas temperature detection circuit
23 regulator
24 multiplexer MUX1
25 multiplexer MUX2
26 engine control unit ECU
27 sub-bypass-passage entrance
28 sub-bypass-passage exit

The invention claimed is:

1. A gas flow rate measuring apparatus including
a gas flow rate detection circuit configured to output a first analog signal of a gas flow rate of a gas flowing in a gas flow path;
a gas temperature detection element configured to output a second analog signal of a temperature of the gas in the gas flow path or a temperature of an integrated circuit;
a first analog-to-digital (AD) converter for converting the first analog signal from the gas flow rate detection circuit into a first digital signal;
a second AD converter for converting the second analog signal from the gas temperature detection element into a second digital signal;
a digital signal correction device comprising a map table and configured to correct a characteristic bend of the first digital signal based on the map table and the second digital signal, resulting in a gas flow rate measurement,
wherein the map table comprises correction constants arranged in a lattice pattern of lattice points;
a first number of lattice points in a first region of the characteristic bend of the gas flow rate signal is larger than a second number of lattice points of a second region outside the first region of the characteristic bend, wherein the first region and the second region are equal in size;
the gas flow rate is represented by Q and a value obtained by zero-span operation of an output characteristic of the gas flow rate detection signal which is a target after correction and an output of the gas flow rate detection signal is represented by $\Delta Y$;
a minimum value of a search region for the characteristic bend is represented by a, a maximum value of the search region for the characteristic bend is represented by b, and a division number between a and b is represented by n; and
a product of a value obtained by dividing a sum of $\Delta Y$ and a gradient of Q for individual intervals obtained by the division between a and b and a value $\Delta Y max$ when $\Delta Y$ is highest between a and b or a value $\Delta Y min$ when $\Delta Y$ is lowest between a and b is represented by S,
the digital signal correction device configured to search for a location of the characteristic bend in accordance with a and b, calculate a magnitude of the characteristic bend on the basis of the magnitude of S, and correct, when the value of an absolute value |S| of S is equal to or higher than 0.005, the gas flow rate detection signal such that the value of |S| is equal to or lower than 0.055 in accordance with the values of a, b, and S.

2. The gas flow rate measuring apparatus according to claim 1, wherein the digital signal correction device includes:
- a first coordinate conversion table for moderating a non-linearity of the gas flow rate detection signal;
- a second coordinate conversion table for moderating a non-linearity of the temperature detection signal; and
- a correction table for carrying out correction on the basis of a signal obtained by the coordinate conversion.

3. The gas flow rate measuring apparatus according to claim 2, wherein the first and second coordinate conversion tables are regular-interval tables of an arbitrary division number.

4. The gas flow rate measuring apparatus according to claim 2, wherein the gas temperature detection signal used for the correction table is a gas temperature signal from the gas temperature detection element.

5. The gas flow rate measuring apparatus according to claim 2, wherein the gas temperature detection signal used for the correction table is a temperature signal from a substrate temperature sensor provided in the integrated circuit.

6. The gas flow rate measuring apparatus according to claim 1, wherein the integrated circuit is configured to generate output signals obtained by correcting the digital signals and output as analog signals the output signals obtained by correcting the digital signals.

7. The gas flow rate measuring apparatus according to claim 1, wherein the gas flow rate measuring apparatus is configured to carry out a correction arithmetic process based on the digital signals input from the gas temperature detection signal and the gas flow rate detection signal from the gas flow rate detection circuit after individual conversion into digital signals.

* * * * *